(12) United States Patent
Tait et al.

(10) Patent No.: US 10,640,012 B2
(45) Date of Patent: May 5, 2020

(54) MODULAR SEAT

(71) Applicant: Faurecia Automotive Seating, LLC, Auburn Hills, MI (US)

(72) Inventors: Shaun D. Tait, Auburn Hills, MI (US); Chad W. Durkee, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/106,139

(22) Filed: Aug. 21, 2018

(65) Prior Publication Data

US 2019/0061562 A1  Feb. 28, 2019

Related U.S. Application Data

(60) Provisional application No. 62/551,445, filed on Aug. 29, 2017.

(51) Int. Cl.
| | |
|---|---|
| *A47C 7/72* | (2006.01) |
| *B60N 2/02* | (2006.01) |
| *B60N 2/64* | (2006.01) |
| *B60N 2/68* | (2006.01) |
| *B60N 2/56* | (2006.01) |
| *B60N 2/90* | (2018.01) |
| *B60N 2/66* | (2006.01) |
| *B60N 2/22* | (2006.01) |

(52) U.S. Cl.
CPC ......... *B60N 2/0292* (2013.01); *B60N 2/0284* (2013.01); *B60N 2/2222* (2013.01); *B60N 2/5621* (2013.01); *B60N 2/5678* (2013.01); *B60N 2/643* (2013.01); *B60N 2/663* (2015.04); *B60N 2/682* (2013.01); *B60N 2/90* (2018.02); *B60N 2/976* (2018.02); *B60N 2002/684* (2013.01)

(58) Field of Classification Search
CPC ........ B60N 2/0292; B60N 2/643; B60N 2/68; B60N 2/5678; B60N 2/976; B60N 2/56; B60N 2/0284; B60N 2/90; B60N 2/663; B60N 2/2222; B60N 2/64; B60N 2/682; B60N 2002/684
USPC ... 297/180.1, 452.18, 452.38, 452.1, 452.16, 297/452.42, 452.43, 452.48
See application file for complete search history.

(56) References Cited

U.S. PATENT DOCUMENTS

| | | | |
|---|---|---|---|
| 9,669,744 B2 | 6/2017 | Cao | |
| 9,718,387 B2* | 8/2017 | Line | ................ B60N 2/68 |
| 10,011,205 B2* | 7/2018 | Line | ............... B60N 2/682 |
| 10,220,750 B2* | 3/2019 | Line | ............... B60N 2/5825 |
| 2015/0008716 A1* | 1/2015 | Dry | ................ B60N 2/90 |
| | | | 297/452.18 |
| 2015/0076880 A1* | 3/2015 | Kuhley | ............... B60N 2/02 |
| | | | 297/313 |
| 2015/0145303 A1* | 5/2015 | Line | ................ B60N 2/643 |
| | | | 297/283.3 |

(Continued)

FOREIGN PATENT DOCUMENTS

| | | |
|---|---|---|
| BR | 102016002827 | 8/2016 |
| CA | 2770968 | 3/2013 |

(Continued)

*Primary Examiner* — Chi Q Nguyen
(74) *Attorney, Agent, or Firm* — Barnes & Thornburg LLP (57) ABSTRACT

An occupant support includes a seat frame and a module assembly. The module assembly is arranged to cover the seat frame.

17 Claims, 6 Drawing Sheets

(56) References Cited

U.S. PATENT DOCUMENTS

| | | | |
|---|---|---|---|
| 2015/0266405 A1* | 9/2015 | Fitzpatrick | B60N 2/5685 |
| | | | 297/180.12 |
| 2015/0277754 A1* | 10/2015 | Misch | G06F 3/04842 |
| | | | 715/769 |
| 2015/0291121 A1* | 10/2015 | Tanabe | B60N 2/68 |
| | | | 280/728.2 |
| 2016/0176327 A1 | 6/2016 | Tippl | |
| 2016/0229322 A1 | 8/2016 | Line | |
| 2017/0036579 A1 | 2/2017 | Line | |
| 2018/0037148 A1* | 2/2018 | Line | B60N 2/809 |
| 2018/0203603 A1* | 7/2018 | Brunn | G06F 3/0485 |
| 2018/0229632 A1* | 8/2018 | Line | B60N 2/5642 |
| 2018/0264974 A1* | 9/2018 | Ramachandran | B60N 2/002 |

FOREIGN PATENT DOCUMENTS

| | | |
|---|---|---|
| DE | 102013225477 | 3/2015 |
| GB | 2387537 | 7/2004 |

\* cited by examiner

MODULAR SEAT

PRIORITY CLAIM

This application claims priority under 35 U.S.C. § 119(e) to U.S. Provisional Application Ser. No. 62/551,445, filed Aug. 29, 2017, which is expressly incorporated by reference herein.

BACKGROUND

The present disclosure relates to a seat, and particularly to a vehicle seat. More particularly, the present disclosure relates to a vehicle seat having interchangeable portions.

SUMMARY

According to the present disclosure, an occupant support includes a seat frame and seat trim formed to include an interior space. The seat trim is arranged to extend around and cover the seat frame to locate the seat frame in the interior space. The seat frame includes a seat-frame bottom and a seat-frame back coupled to the seat-frame bottom to extend upwardly away from the seat-frame bottom.

In illustrative embodiments, the module assembly includes at least one module coupled to the seat frame and located in the interior space. The at least one module is interchangeable with a separate module to change the occupant support from a first configuration to a second configuration. The first configuration includes a first function and/or set of functions and the second configuration includes a second function and/or set of functions.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figures 1, 2:
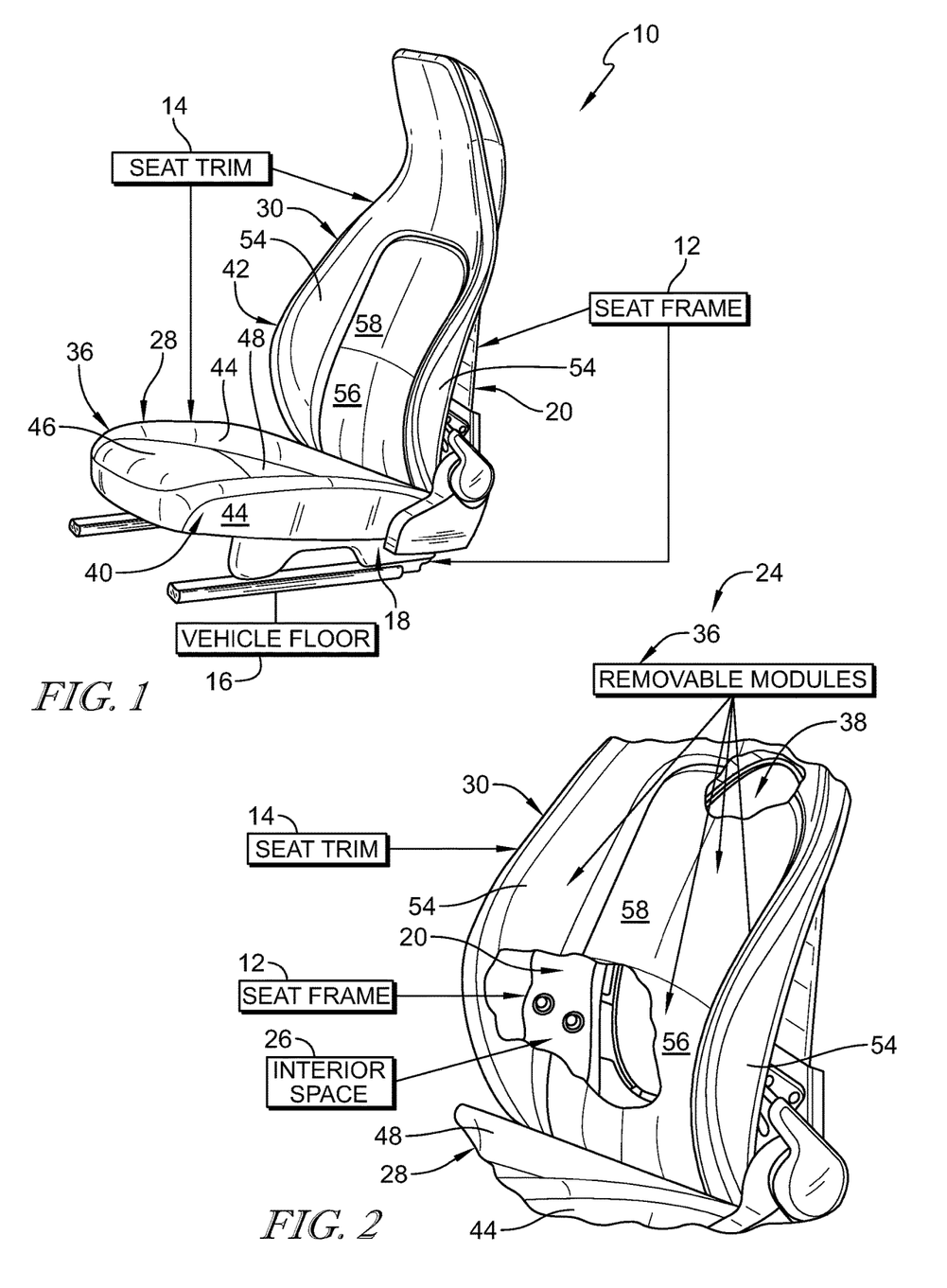
FIG. 1 is a perspective and diagrammatic view, in accordance with the present disclosure, showing an occupant support coupled to a vehicle floor including a seat frame arranged to overlie a vehicle floor and seat trim sized to cover the seat frame.
FIG. 2 is a perspective and diagrammatic view of a portion of the occupant support with portions removed to show that the module assembly includes one or more modules coupled to the seat frame and arranged to lie in an interior space defined by the seat trim.

An occupant support 10, in accordance with the present disclosure, includes a seat frame 12, seat trim 14, and a module assembly 24 as shown in FIGS. 1 and 2. Occupant support 10 may comprise a seat for a vehicle. Seat frame 12 is adapted to be coupled to and supported by a vehicle floor 16. Seat frame 12 includes a seat-frame bottom 18 and a seat-frame back 20. Seat-frame bottom 18 is arranged in a generally spaced-apart relation to vehicle floor 16 and is coupled thereto. Seat-frame back 20 extends upwardly from a rear end of seat-frame bottom 18 as shown in FIG. 1. Seat-frame bottom 18 and seat-frame back 20 each have a fixed shape that are configured to receive the module assembly 24 and seat trim 14.

The seat trim 14 is formed to include an interior space 26 and seat frame 12 is located in the interior space 26. The module assembly 24 is coupled to seat frame 12 arranged to lie in the interior space 26. The seat trim is sized and shaped to fit around seat frame 12 and substantially close interior space 26 when occupant support 10 is fully assembled. The module assembly 24 and seat trim 14 are adapted to support an individual occupying occupant support 10. Seat trim 14 has an exterior surface that provides a pre-determined shape of occupant support 10 for the support of an occupant or user.

The module assembly 24 includes a cushion module assembly 28 that is sized and shaped to receive seat-frame bottom 18 and back module assembly 30 that is sized and shaped to receive seat-frame back 20. Occupant support 10 includes a seat cushion comprising seat-frame bottom 18 and cushion module assembly 28, and a seat back comprising seat-frame back 20 and back module assembly 30. The module assembly 24 includes one or more interchangeable modules 36. Each module 36 defines a module space 38 included in interior space 26 as suggested in FIG. 2. Each module 36 may comprise a portion of the modular assembly. Each module 36 is removably coupled to seat frame 12 with one or more fastening mechanisms. The fastening mechanisms may comprise, for example, clips, bolts, screws, fasteners, push pins, and the like. Each module 36 is selectively interchangeable such that a selected module 36 can be interchanged with a separate replacement module.

Modules 36 include cushion modules 40 that form cushion module assembly 28 and back modules 42 that form back module assembly 30. Cushion modules 40 may include a plurality of cushion bolster modules 44, such as a left cushion bolster module and a right cushion bolster module, a front insert module 46, and a rear insert module 48. Rear insert module 48 includes a back end located adjacent seat-frame back 20. Front insert module 46 includes a rear end located adjacent a front end of rear insert module 48 and a front end located at a front end of seat frame 12. Cushion bolster modules 44 are located on opposing left and right sides of front insert module 46 and rear insert module 48. Each of the cushion bolster modules 44, front insert module 46 and rear insert module 48 are individually selectively interchangeable with a separate replacement module.

Back modules 42 of back module assembly 30 include a plurality of back bolster modules 54, such as a left back bolster module and a right back bolster module, a lower insert module 56, and an upper insert module 58. Lower insert module 56 includes a bottom end located adjacent the back end of rear insert module 48 of cushion trim 28. Upper insert module 58 has a bottom end located adjacent a top end of lower insert module 56. Back bolster modules 54 are located on opposing left and right sides of lower insert module 56 and upper insert module 58. Each back bolster module 54, lower insert module 56 and upper insert module 58 is individually selectively interchangeable with a separate replacement module.

Each module 36 may include one or more function mechanisms 60, or no function mechanism 60, as desired. Each module 36 of the module assembly 24 is configured to provide various selected functions and features to occupant support 10 depending upon the function mechanism 60 included in each module 36. For example, modules 36 may include one or more of a heat mechanism 62, a haptic mechanism 64, a bolster adjustment mechanism 66, a four-way positioning lumbar adjustment mechanism 68, a two-way positioning lumbar adjustment mechanism 70, a massage mechanism 72, a ventilation mechanism 74, an upper back adjustment mechanism 76, a cushion length adjustment mechanism 78, and active wellness mechanism 80. Each function mechanism 60 included in a module 36 provides a different feature or function to the module 36 and to the user of occupant support 10. Each function mechanism 60 of a module 36 may be operatively connected to a control system. Function mechanisms 60 may be connected to the control system by, for example, electrical connectors, plug-in connectors, snap connectors, pneumatic connectors, electromechanical connectors, and the like.

Heat mechanism 62 is adapted to provide selective thermal sensations, such as, for example, a heating sensation or a cooling sensation to a user. Haptic mechanism 64, provides haptic feedback, and refers to interactive notification features, such as, for example, vibrations or another suitable interactive feature to a user. Bolster adjustment mechanism 66 provides adjustments to bolsters 44 and 54, such as adjustable and pivotable movement to the bolsters, to maximize comfort for a user of occupant support 10. Four-way positioning lumbar adjustment mechanism 68 provides adjustable lumbar support for the lower back of a user about four adjustment criteria. Two-way positioning lumbar adjustment mechanism 70 provides adjustable lumbar support for the lower back of a user about two adjustment criteria.

Massage mechanism 72 provides a massaging effect to the user of occupant support 10. Ventilation mechanism 74 provides humidity and/or moisture control for the comfort of the user. Upper back adjustment mechanism 76 provides for selective adjustment of the position of a user's back and head relative to seat-frame back 20. Cushion length adjustment mechanism 78 provides adjustment to the length of cushion trim 28 to accommodate users of different sizes. Active wellness mechanism 80 includes biometric sensors to sense various biometric conditions as experienced by a user. Reference is hereby made to US Pat. App. Pub. No. 2015/0266405 and US Pat. App. Pub. No. 2016/0354027 for a disclosure relating to active wellness, and each application is hereby incorporated by reference in its entirety.

Each module 36 of the module assembly 24 may include one or more of function mechanisms 62, 64, 66, 68, 70, 72, 74, 76, 78, and 80 to provide a selected module 36 with a desired function or functions. Occupant support 10 is thereby selectively customizable in different configurations that include selected function mechanisms 60 in selected modules 36 of the module assembly 24 of occupant support 10 to provide the desired functions and features to a user of occupant support 10.

Occupant support 10 is upgradable from a base configuration including modules 36 having a first set of function mechanisms 60, or no function mechanisms 60, to a mid-configuration including modules 36 having a second set of function mechanisms 60 and to a premium configuration including modules 36 having additional function mechanisms 60. The final configuration of occupant support 10 can be made by initially selecting all of the modules 36 of the module assembly 24 with the desired function mechanisms 60 and coupling them to seat frame 12 as part of the module assembly 24. Alternatively, the final configuration of occupant support 10 can be made by selectively interchanging one or more modules 36 already coupled to seat frame 12 and that form the modular assembly with a separate replacement module 36 having a different set of function mechanisms 60 than what was included in the original interchanged module 36.

Figure 3:
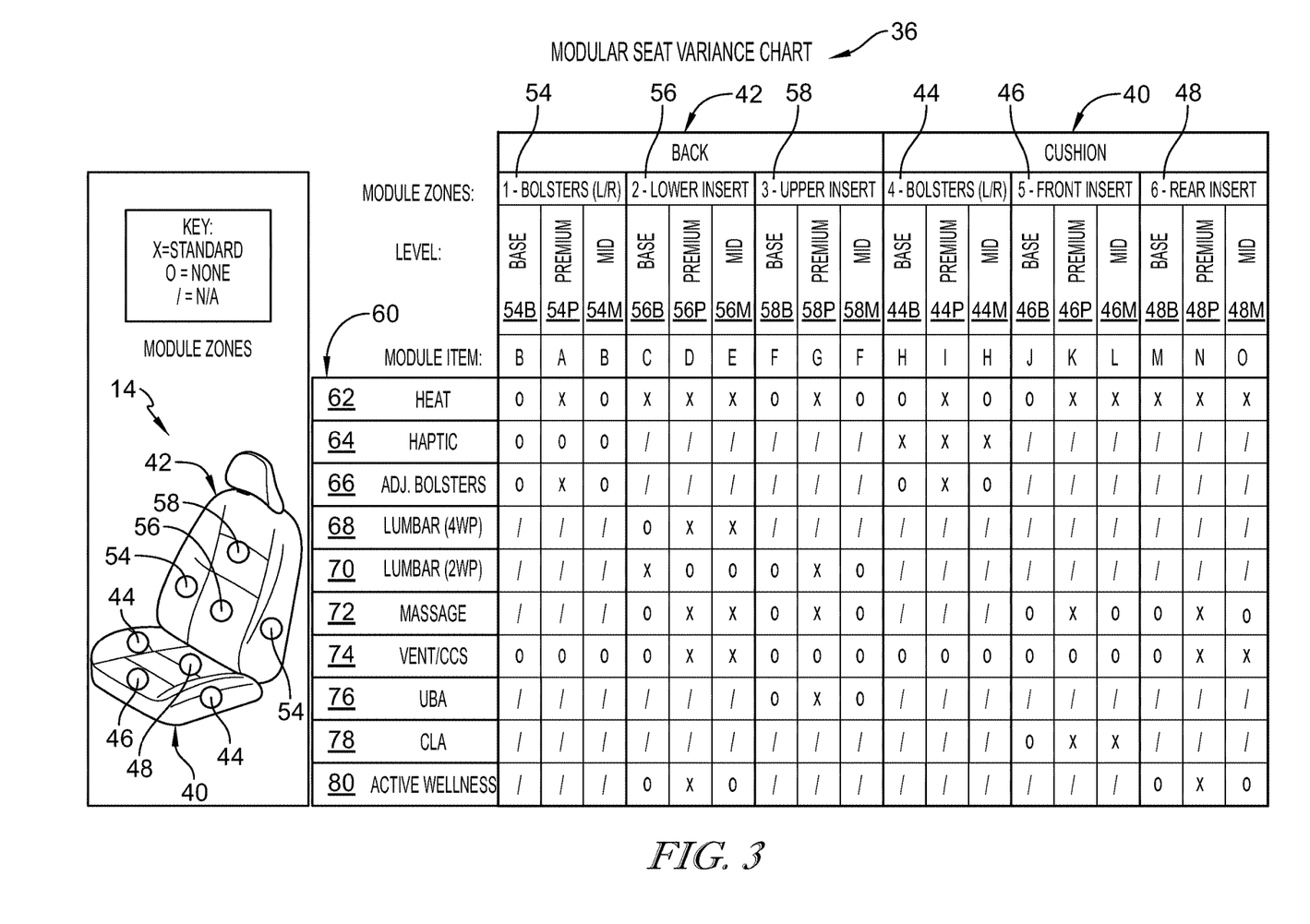
FIG. 3 is an exemplary diagrammatic view of the occupant support showing that the occupant support includes a plurality of interchangeable modules that are upgradable from a base configuration to a mid-configuration and a premium-configuration and showing a chart corresponding to the interchangeable modules in each of the base, mid, and premium configurations.
Figure 4:
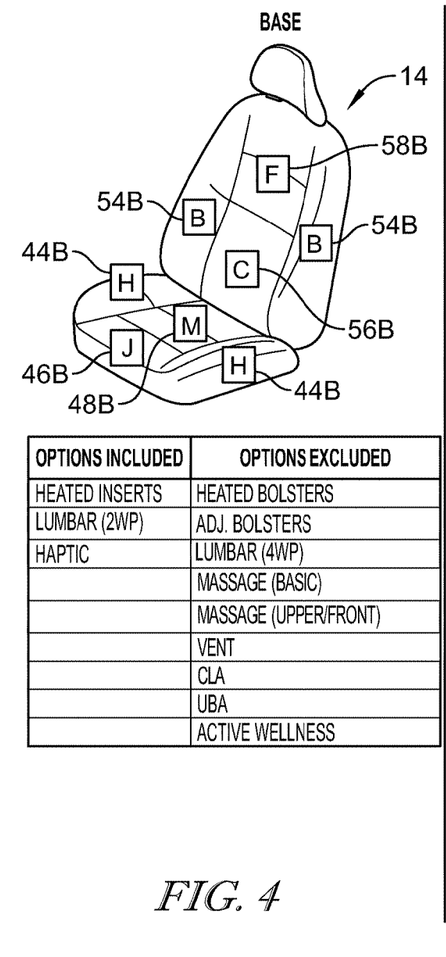
FIG. 4 is a diagrammatic view of the occupant support arranged in one example of the base configuration.

As shown for example in FIGS. 3 and 4, a base configuration of occupant support 10 may include cushion modules 40 including cushion bolster modules 44B with a haptic mechanism 64, a front insert module 46B including no function mechanisms 60, and a rear insert module 48B having a heat mechanism 62. The base configuration of occupant support 10 in the example of FIG. 3, may include back modules 42 including back bolster modules 54B including no function mechanism 60, a lower insert module 56B including heat mechanism 62 and two-way positioning lumbar adjustment mechanism 70, and an upper insert module 58B including no function mechanisms 60.

Figure 5:
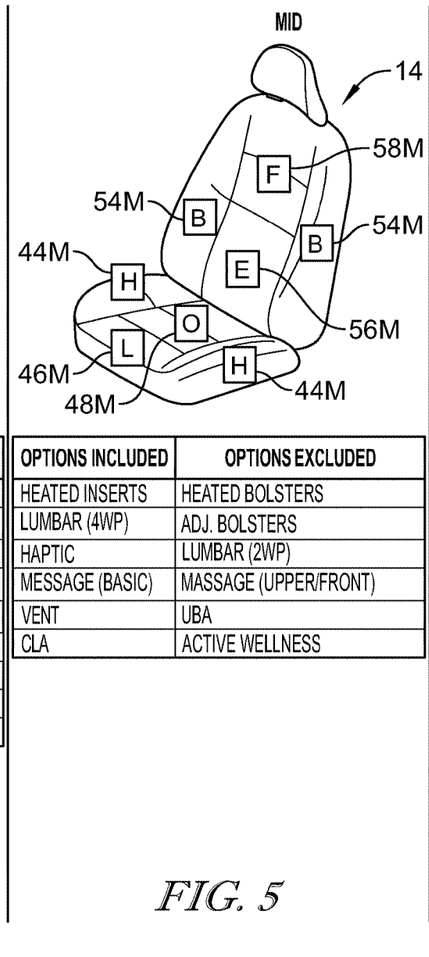
FIG. 5 is a diagrammatic view of the occupant support arranged in one example of the mid-configuration.

As also shown for example in FIGS. 3 and 5, the upgraded mid-configuration of occupant support 10 may include cushion modules 40 with cushion bolsters 44M having a haptic mechanism 64, a front insert module 46M having a heat mechanism 62 and cushion length adjustment mechanism 78, and a rear insert module 48M having heat mechanism 62 and ventilation mechanism 74. Back modules 42 may include back bolster modules 54M having no function mechanism 60, a lower insert module 56M having heat mechanism 62, four-way positioning lumbar adjustment mechanism 68, massage mechanism 72 and ventilation mechanism 74, and an upper insert module 58M having no function mechanism 60.

Figure 6:
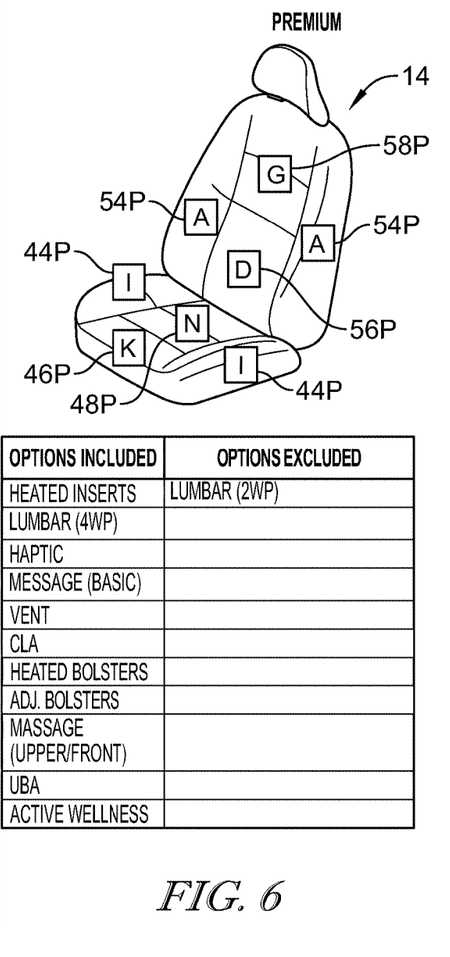
FIG. 6 is a diagrammatic view of the occupant support arranged in one example of the premium configuration.
Figure 7:
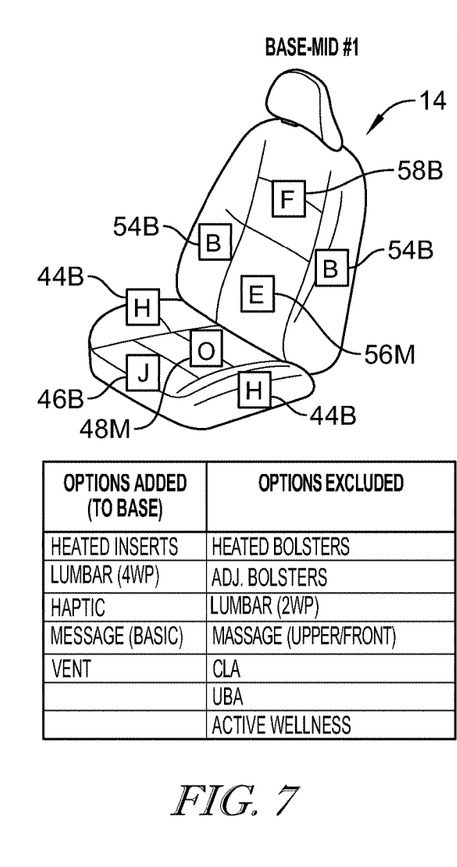
FIGS. 7-15 are diagrammatic views of the occupant support arranged in other examples of the base, mid, and premium configurations.
Figure 8:
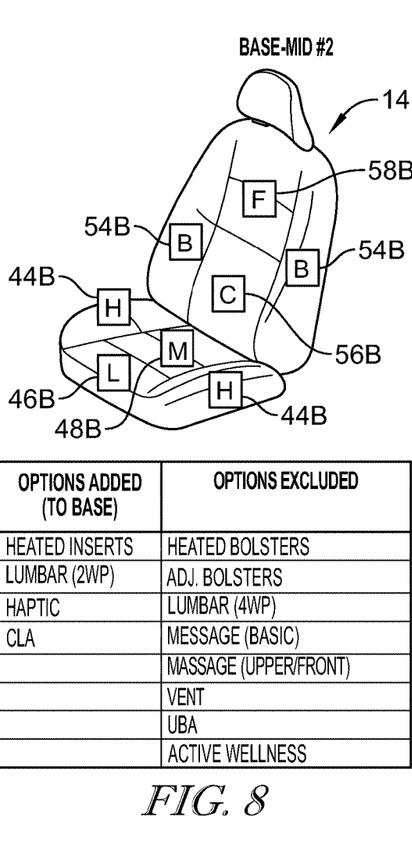
Figure 9:
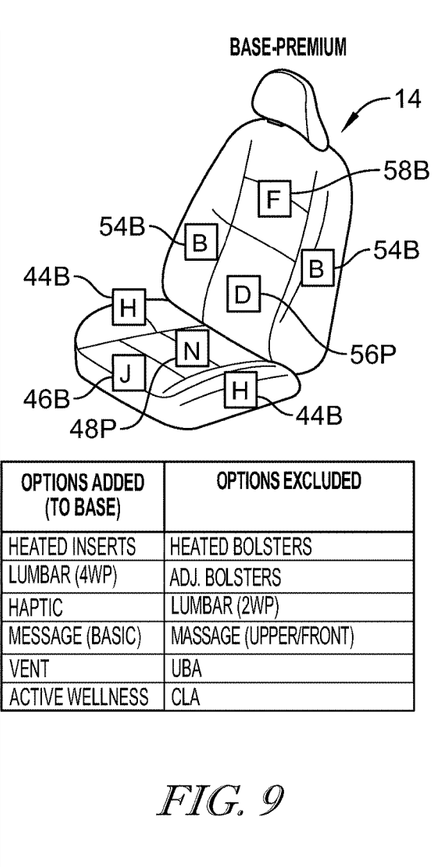
Figure 10:
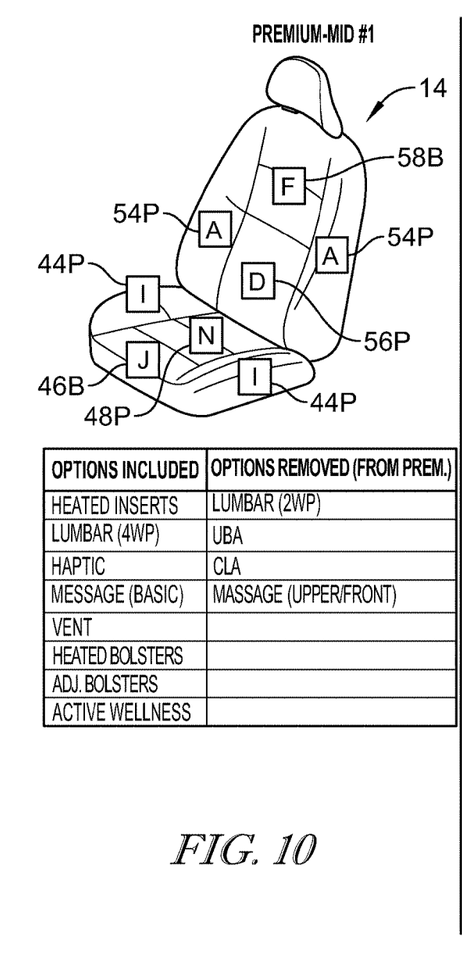
Figure 11:
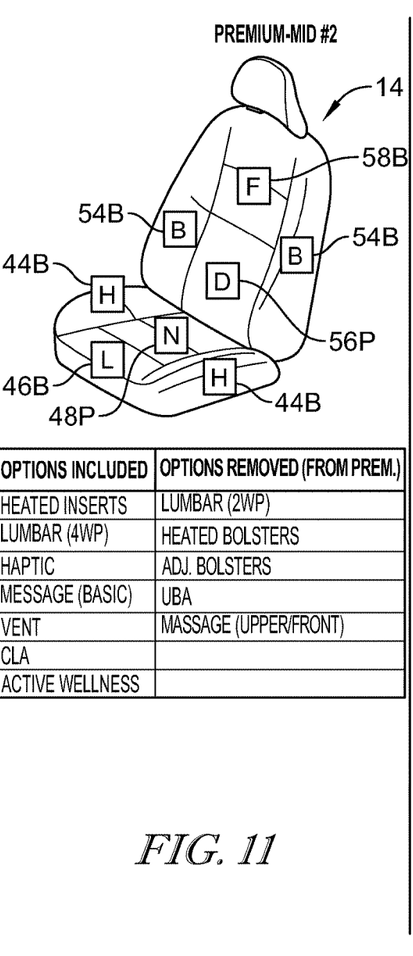
Figure 12:
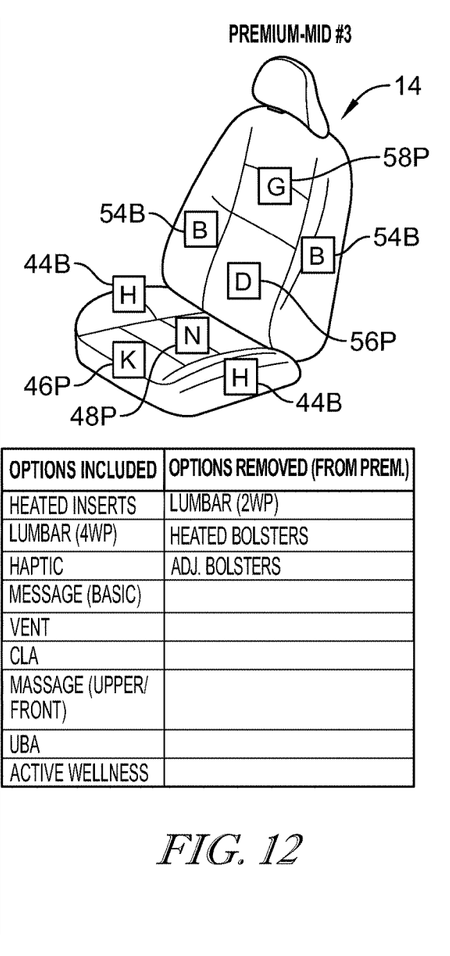
Figure 13:
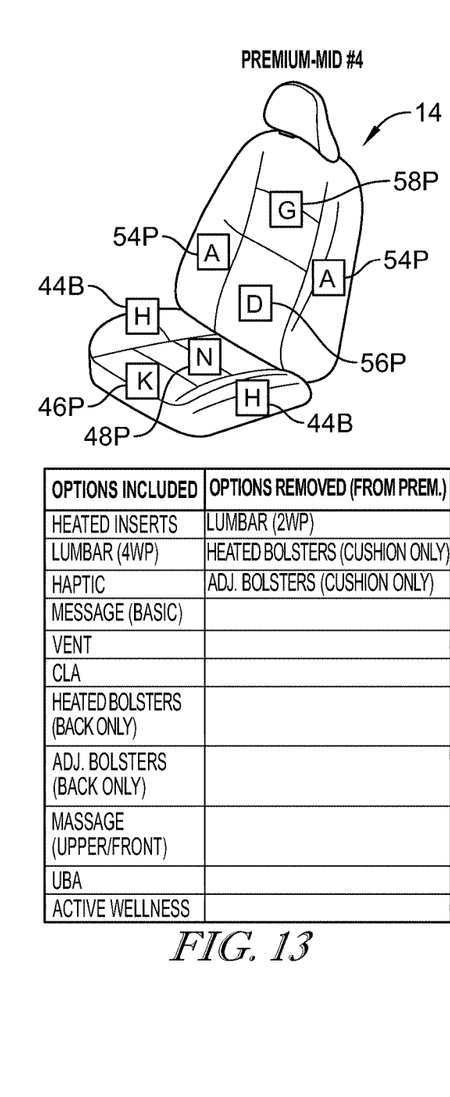
Figure 14:
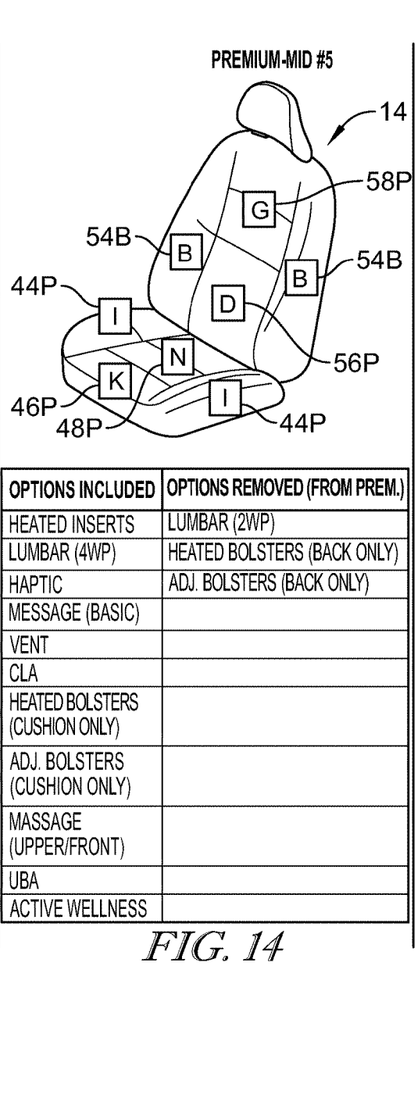
Figure 15:
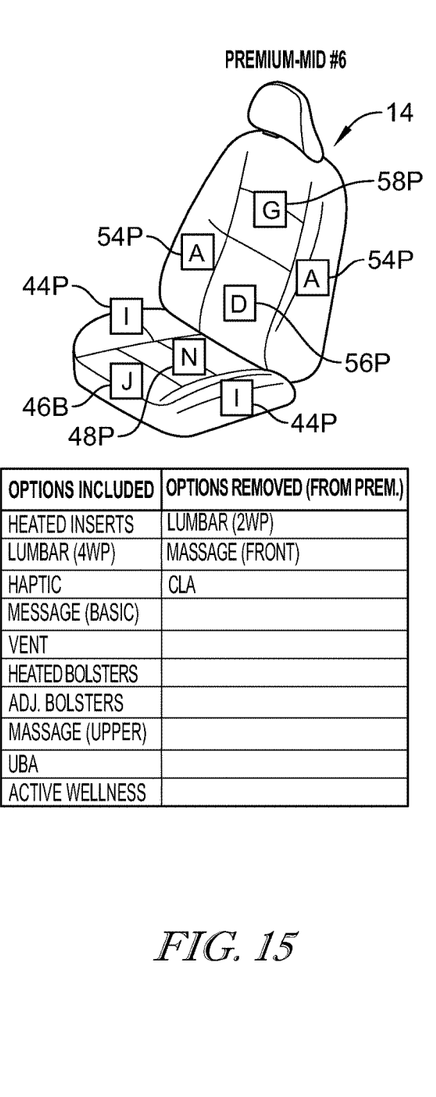

As also shown for example in FIGS. 3 and 6, the further upgraded premium configuration of occupant support 10 may include cushion modules 40 including cushion bolster modules 44P having heat mechanism 62, haptic mechanism 64 and bolster adjustment mechanism 66, a front insert module 46P having heat mechanism 62, massage mechanism 72 and cushion length adjustment mechanism 78, and a rear insert module 48P including heat mechanism 62, massage mechanism 72, ventilation mechanism 74 and active wellness mechanism 80. Back modules 42 may include back bolster modules 54P including heat mechanism 62 and bolster adjustment mechanism 66, a lower insert module 56P having heat mechanism 62, four-way positioning lumbar support mechanism 68, massage mechanism 72, ventilation mechanism 74 and active wellness mechanism 80, and an upper insert module 58P having heat mechanism 62, two-way positioning lumbar support mechanism 70, massage mechanism 72, and upper back adjustment mechanism 76.

The modular construction of occupant support 10 of occupant support 10 allows each module 36 thereof to be selected with one or more desired function mechanisms 60, or to have an initial previously installed module 36 interchanged with a separate replacement module 36 having the desired function mechanisms 60, to provide occupant support 10 in a desired customized configuration with each module 36 having the desired function mechanisms 60.

FIG. 4 shows the configuration of occupant support 10 in the base configuration as described in the chart of FIG. 3.

FIG. 5 shows the configuration of occupant support 10 in the mid-configuration as described in the chart of FIG. 3 as an upgrade from the base configuration of FIG. 4. FIG. 6 shows the premium configuration of occupant support 10 as described in the chart of FIG. 3 as an upgrade from the mid-configuration of FIG. 5.

FIGS. 7-15 each show a different configuration of the module assembly 24 for occupant support 10 and illustrate, as examples, the various different configurations in which the module assembly 24 may be formed by selective use of selective modules 36 having selected function mechanisms 60 to form the module assembly 24 of occupant support 10.

The invention claimed is:

1. An occupant support comprising:
a seat frame adapted to be supported by a vehicle floor,
seat trim defining an interior space, the seat frame located in the interior space and the seat trim coupled to the seat frame, and
a module assembly coupled to the seat frame and located in the interior space, the module assembly including one or more modules,
wherein each module is adapted to be selectively interchanged with a separate replacement module, at least one of the one or more modules having a selected function mechanism such that the module assembly is configured with one or more desired modules having desired function mechanisms,
wherein the module assembly includes a first bolster module, a second bolster module located in spaced-apart lateral relation to the first bolster module, a front insert module located between the first and second bolsters, and a rear insert module located behind the front insert module and between the first and second bolster modules.

2. The occupant support of claim 1, wherein the first bolster module and the second bolster module include one or more function mechanisms selected from the group comprising a heating mechanism, a haptic mechanism, an adjustment mechanism, a massage mechanism, and a ventilation mechanism.

3. The occupant seat of claim 1, wherein the front insert module includes one or more function mechanisms selected from the group comprising a heating mechanism, a massage mechanism, a ventilation mechanism, and a length adjustment mechanism.

4. The occupant seat of claim 1, wherein the rear insert module one or more function mechanisms selected from the group comprising a heating mechanism, a massage mechanism, a ventilation mechanism, and an active wellness mechanism.

5. An occupant support comprising:
a seat frame adapted to be supported by a vehicle floor,
seat trim defining an interior space, the seat frame located in the interior space and the seat trim coupled to the seat frame, and
a module assembly coupled to the seat frame and located in the interior space, the module assembly including one or more modules,
wherein each module is adapted to be selectively interchanged with a separate replacement module, at least one of the one or more modules having a selected function mechanism such that the module assembly is configured with one or more desired modules having desired function mechanisms,
wherein the module assembly includes a first bolster module, a second bolster module located in spaced-apart lateral relation to the first bolster module, a lower insert module located between the first and second bolster modules, and an upper insert module located above the lower insert module and between the first and second bolster modules.

6. The occupant support of claim 5, wherein the first bolster module and the second bolster module include one or more function mechanisms selected from the group comprising a heating mechanism and an adjustment mechanism.

7. The occupant support of claim 5, wherein the lower insert module includes one or more of the following function mechanisms selected from the group comprising a heating mechanism, a lumbar adjustment mechanism, a massage mechanism, a ventilation mechanism, and an active wellness mechanism.

8. The occupant support of claim 5, wherein the upper insert module includes one or more of the following function mechanisms selected from the group comprising a heating mechanism, a lumbar adjustment mechanism, a massage mechanism, and an upper back adjustment mechanism.

9. A method of arranging an occupant support, the method comprising the steps of:
providing a seat frame,
providing a seat trim formed to include an interior space therein, the seat frame is located in the interior space and the seat trim coupled to the seat frame,
providing a plurality of modules for forming a module assembly, the module assembly adapted to be coupled to the seat frame and located in the interior space, the plurality of modules including a plurality of cushion modules and a plurality of back modules, the plurality of cushion modules including a first cushion module having a first function mechanism and a second cushion module having a function mechanism that is different from the function mechanism of the first cushion module, the plurality of back modules including a first back module having a second function mechanism and a second back module having a function mechanism that is different from the function mechanism of the first back module,
attaching a selected one of the first cushion module and the second cushion module to the seat frame, and
attaching a selected one of the first back module and the second back module to the seat frame.

10. The method of claim 9, wherein the cushion module includes a first bolster module, a second bolster module located in spaced-apart lateral relation to the first bolster module, a front insert module located between the first and second bolsters, and a rear insert module located behind the front insert module and between the first and second bolster modules.

11. The method of claim 10, wherein the first bolster module and the second bolster module include one or more function mechanisms selected from the group comprising a heating mechanism, a haptic mechanism, and an adjustment mechanism.

12. The method of claim 10, wherein the front insert module includes one or more function mechanisms selected from the group comprising a heating mechanism, a massage mechanism, and a length adjustment mechanism.

13. The method of claim 10, wherein the rear insert module one or more function mechanisms selected from the group comprising a heating mechanism, a massage mechanism, a ventilation mechanism, and an active wellness mechanism.

14. The method of claim 9, wherein the back module includes a first bolster module, a second bolster module located in spaced-apart lateral relation to the first bolster module, a lower insert module located between the first and second bolster modules, and an upper insert module located above the lower insert module and between the first and second bolster modules.

15. The method of claim 14, wherein the first bolster module and the second bolster module include one or more function mechanisms selected from the group comprising a heating mechanism and an adjustment mechanism.

16. The method of claim 14, wherein the lower insert module includes one or more of the following function mechanisms selected from the group comprising a heating mechanism, a lumbar adjustment mechanism, a massage mechanism, a ventilation mechanism, and an active wellness mechanism.

17. The method of claim 14, wherein the upper insert module includes one or more of the following function mechanisms selected from the group comprising a heating mechanism, a lumbar adjustment mechanism, a massage mechanism, and an upper back adjustment mechanism.

* * * * *